United States Patent [19]

Brown et al.

[11] 4,103,165

[45] Jul. 25, 1978

[54] NEUTRON RESPONSIVE SELF-POWERED RADIATION DETECTOR

[75] Inventors: Donald P. Brown, Richland; Collins P. Cannon, Kennewick, both of Wash.

[73] Assignee: The United States of America as represented by the United States Department of Energy, Washington, D.C.

[21] Appl. No.: 780,625

[22] Filed: Mar. 23, 1977

[51] Int. Cl.² ............................................. G01T 3/00
[52] U.S. Cl. ..................................... 250/390; 250/370
[58] Field of Search ................ 250/370, 390, 391, 392

[56] References Cited

U.S. PATENT DOCUMENTS

| 3,137,792 | 6/1964 | Staples et al. ......................... 250/392 |
| 4,008,399 | 2/1977 | Brown ............................. 250/370 X |

Primary Examiner—Davis L. Willis
Attorney, Agent, or Firm—Dean E. Carlson; Richard E. Constant

[57] ABSTRACT

An improved neutron responsive self-powered radiation detector is disclosed in which the neutron absorptive central emitter has a substantially neutron transmissive conductor collector sheath spaced about the emitter and the space between the emitter and collector sheath is evacuated.

1 Claim, 1 Drawing Figure

U.S. Patent  July 25, 1978  4,103,165
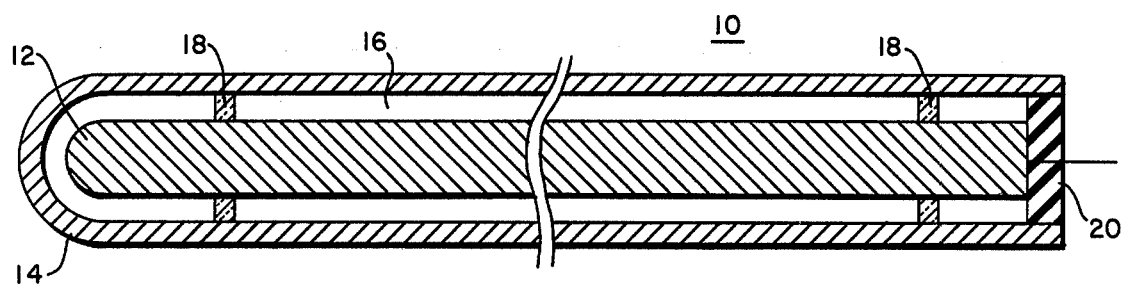

NEUTRON RESPONSIVE SELF-POWERED RADIATION DETECTOR

This invention was made under contract with the United States Department of Energy.

BACKGROUND OF THE INVENTION

The present invention relates to neutron responsive self-powered radiation detectors. A self-powered radiation detector is one which does not require application of any potential between the electrodes of the device. Such devices are typically of a very small diameter and include a centrally disposed emitter wire, a dielectric insulator about the emitter, and a coaxial collector sheath about the dielectric insulator. The self-powered neutron detector is particularly suitable for in-core real time measurement of neutron flux. Most such self-powered neutron detectors utilize an emitter material having a high neutron capture cross-section so that beta radiation is emitted from the emitter upon neutron interaction. The emitted beta radiation passes to the collector sheath electrode. The externally sensed current results from the beta current passing from the emitter to the collector. The dielectric insulator has been thought necessary to slow down the beta particles to permit their ultimate collection by the collector sheath electrode.

For in-core instrumentation, relatively high gamma radiation is always present along with the neutron flux. The gamma radiation produces a current contribution for such self-powered detectors which detracts from the neutron sensitivity of the device. A variety of gamma compensation techniques have been utilized to permit distinction of the neutron signal from the gamma signal. For fast-neutron flux monitoring detectors, the average neutron flux cross-section is relatively low and the gamma induced current is about the same magnitude as the neutron induced current. The neutron current is induced by the outward movement of beta radiation emitted from the emitter. The external gamma environment will produce inwardly moving Compton electrons moving from the collector to the emitter. There are thus two opposed currents induced in the detector from the separate mechanisms. It is highly desirable to be able to eliminate such gamma induced current in self-power detectors, particularly for devices designed for measuring fast neutron flux.

SUMMARY OF THE INVENTION

An improved neutron responsive self-power radiation detector is disclosed in which the solid dielectric insulator between the emitter and the collector electrodes is removed and the space between such electrodes is evacuated. For fast neutron flux monitoring, the emitter comprises a neutron absorptive low density conductor material, while the conductive collector sheath comprises a substantially neutron transmissive material. The preferred emitter material is beryllium.

BRIEF DESCRIPTION OF THE DRAWINGS

The sole FIGURE is an elevational view in section of the improved neutron responsive self-powered radiation detector of the present invention.

DESCRIPTION OF THE PREFERRED EMBODIMENTS

The neutron self-powered radiation detector 10 comprises an elongated rod-like centralized emitter 12. A generally tubular conductive collector sheath 14 is coaxially disposed about and spaced from the central emitter 12. The space or chamber 16 defined between the emitter 12 and the collector 14 is evacuated. The removal of the solid dielectric insulator of the prior art, and provision of the vacuum between the emitter and the collector reduces the gamma induced current for such device. It improves the neutron sensitivity of the device by permitting all of the beta radiation emitted from the emitter to reach the collector instead of being trapped in the solid dielectric insulator. The provision of a vacuum chamber thus contributes to an improved overall operation of the detector.

By way of example, the central emitter is formed of a low atomic number, neutron absorptive, low-density conductive emitter such as beryllium. The beryllium emitter is about 0.25 inch in diameter and about 5 inches long. The substantially neutron transmissive conductive collector sheath is preferably formed of a ferro-alloy metal such as Inconel steel or stainless steel tube, which has an internal diameter of about ⅜ inch, and is about 0.020 inch thick. Ceramic spacers 18 are provided at each end of the emitter between the emitter and the collector to support the emitter at the center of the detector. An insulating seal member 20 is provided at the one end of the detector with an aperture provided to permit the emitter to be connected to the coaxial instrumentation cable center wire. The cable sheath is sealed to and connected to the detector collector sheath.

The gamma radiation to which the detector is subjected when placed in the core of a reactor produces Compton electrons from the collector sheath. These Compton electrons move toward the centralized emitter inducing currents of opposite polarity to that caused by the neutron generated emitted beta radiation from the emitter. The improved neutron sensitivity and performance of the present detector design with a vacuum space provided between the emitter and the collector is due to the fact that Compton electrons produced in the sheath move through the evacuated space between the electrodes and pass through the detector rather than becoming trapped in any insulation means between the electrodes. The positive and negative currents produced by such Compton electrons as they first move toward the emitter and then away from the emitter in traversing the detector produce a net time average current zero. The resultant detector has an improved sensitivity.

We claim:

1. A neutron responsive self-powered radiation detector comprising a neutron absorptive, low density, conductive emitter of beryllium, and a substantially neutron transmissive conductive collector sheath of ferro-alloy spaced from and disposed about the emitter, with the space between the emitter and the collector sheath being evacuated.

* * * * *